Sept. 3, 1946.    E. A. STALKER    2,406,916
WINGS AND OTHER AERODYNAMIC BODIES
Filed March 18, 1939    6 Sheets-Sheet 1

INVENTOR
Edward A. Stalker

Sept. 3, 1946.  E. A. STALKER  2,406,916
WINGS AND OTHER AERODYNAMIC BODIES
Filed March 18, 1939   6 Sheets-Sheet 2

INVENTOR
Edward A. Stalker

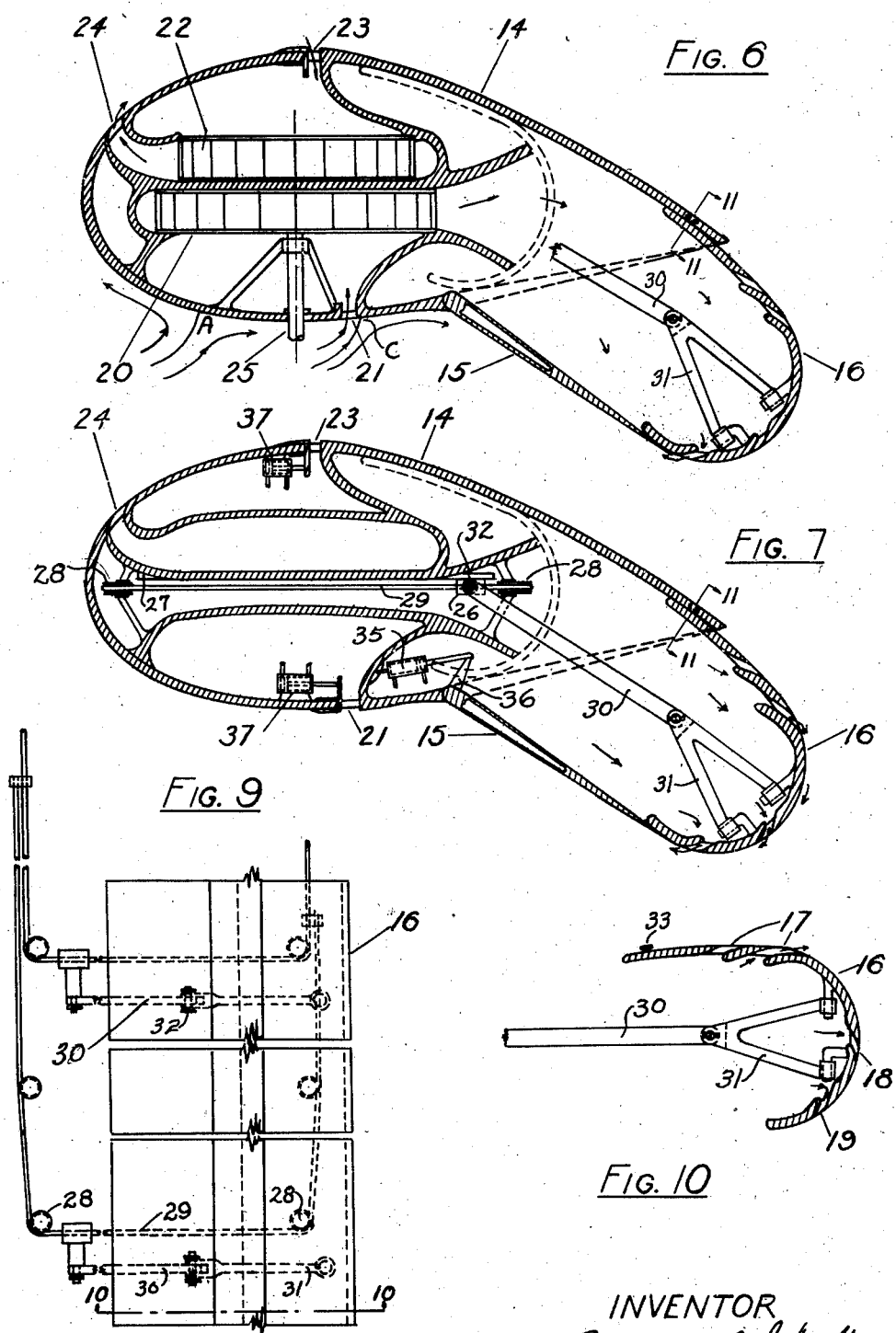

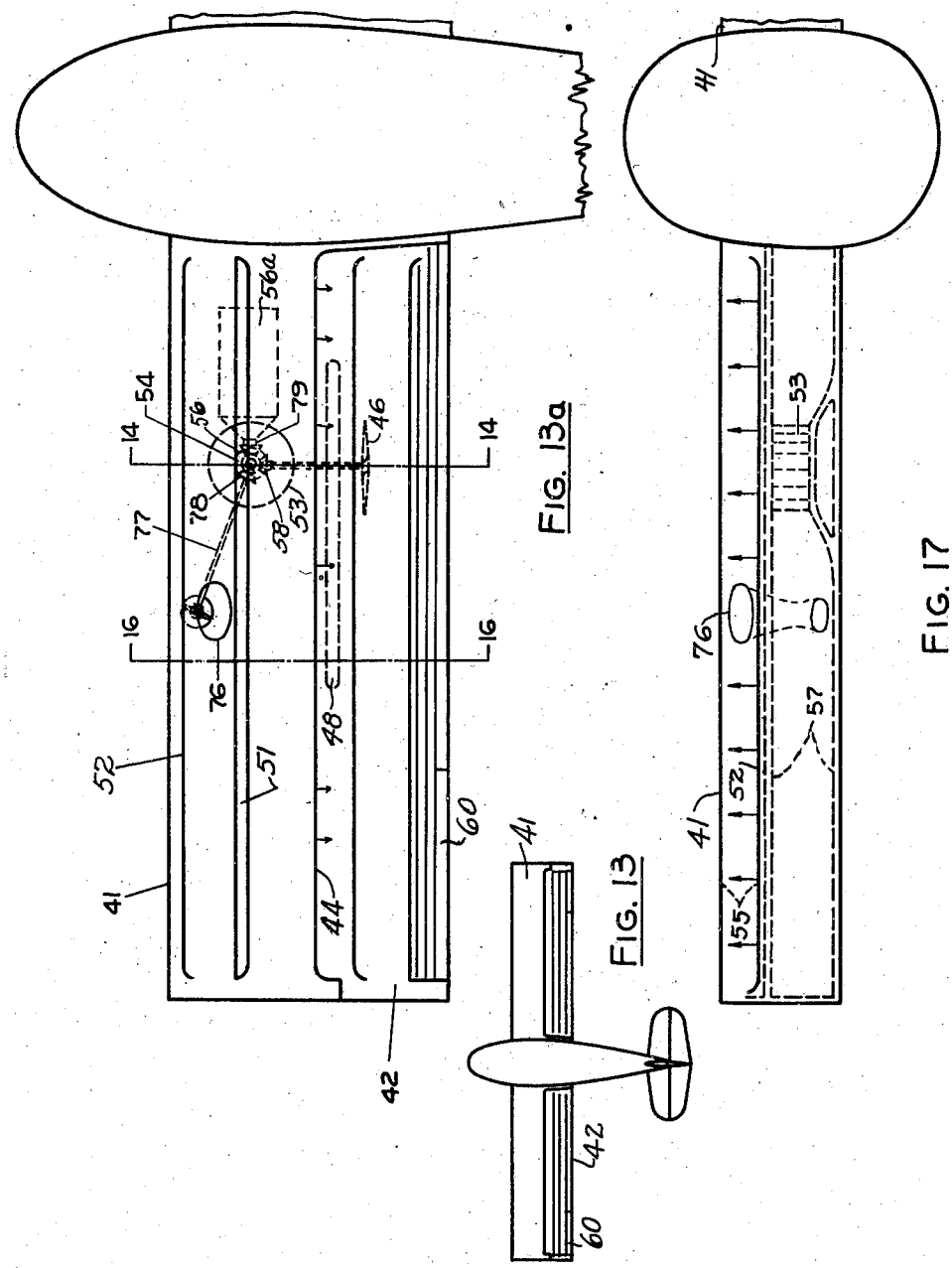

Sept. 3, 1946.  E. A. STALKER  2,406,916

WINGS AND OTHER AERODYNAMIC BODIES

Filed March 18, 1939  6 Sheets—Sheet 5

INVENTOR
Edward A. Stalker

Sept. 3, 1946.  E. A. STALKER  2,406,916
WINGS AND OTHER AERODYNAMIC BODIES
Filed March 18, 1939  6 Sheets-Sheet 6

INVENTOR
Edward A. Stalker

Patented Sept. 3, 1946

2,406,916

UNITED STATES PATENT OFFICE 2,406,916

WINGS AND OTHER AERODYNAMIC BODIES

Edward A. Stalker, Ann Arbor, Mich.

Application March 18, 1939, Serial No. 262,801

6 Claims. (Cl. 244—42)

My invention relates to bodies creating a cross flow force when bathed by a relative flow of fluid. It relates particularly to aircraft wings of all types.

The objects of my invention are, first to create a high lifting capacity, and second to reduce the drag. Other objects will appear from the accompanying drawings and description.

I accomplish the above objects by the means illustrated in the accompanying drawings in which:

Figure 1A relates to the theory;

Figure 6 is a vertical chordwise cross section of the wing taken along line 6—6 in Figure 5;

Figure 7 is a vertical chordwise section taken along line 7—7 in Figure 5;

Figure 9 is a fragmentary plan view of the mechanism to move the wing extension rearward;

Figure 10 is a fragmentary section taken along line 10—10 in Figure 9;

Figure 13 is a top plan view of the airplane incorporating the preferred form of wing;

Figure 13a is a fragmentary top plan view of the preferred form of wing;

Figure 14 is a vertical section along the line 14—14 in Figure 13a;

Figure 16 is a vertical section of the wing taken along line 16—16 in Figure 13a;

Figure 17 is a front elevation of the wing and part of the fuselage;

It is desirable first to explain certain conceptions and definitions.

Figure 1A:
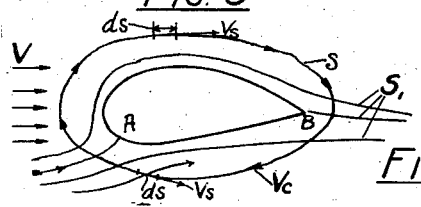
Figures 5, 8:
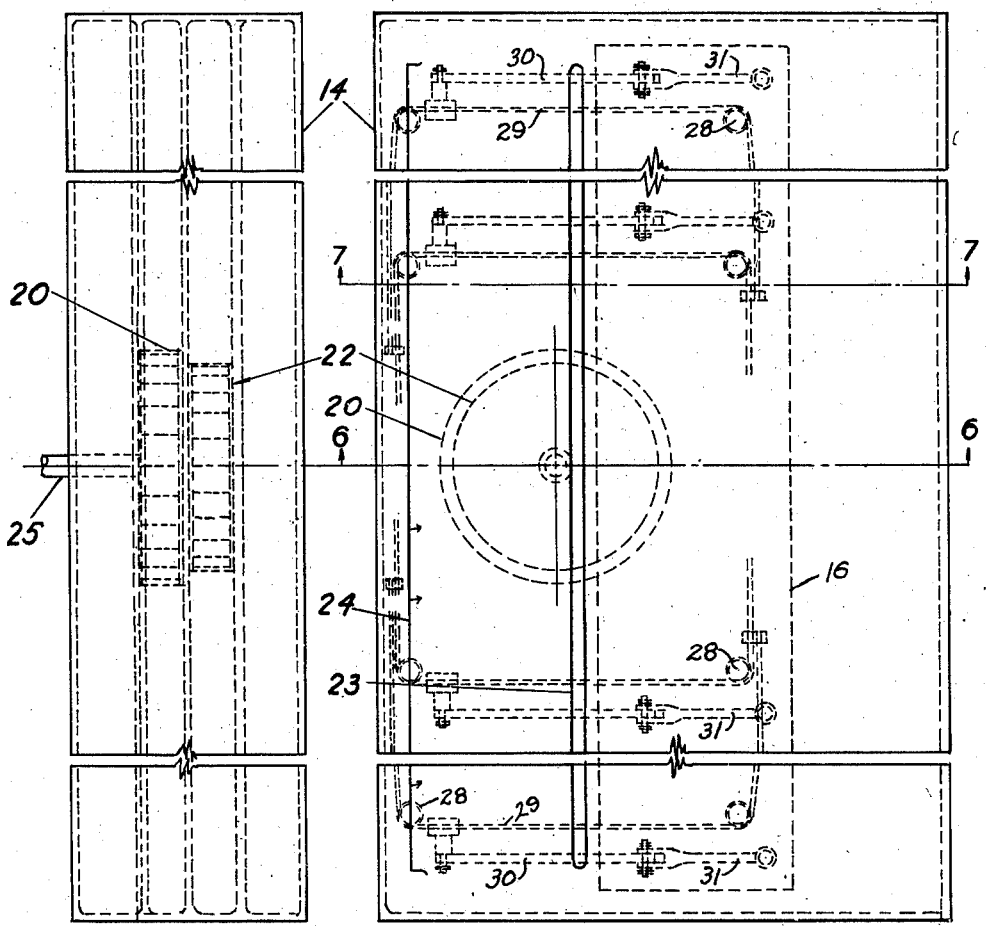
Figure 5 is a plan view of a second wing.
Figure 8 is a front view of the wing.

The flow about a wing may be decomposed into a rectilinear flow rearward as indicated by V in Figure 1A and a circulation flow $V_c$ along a closed curve S. The vectorial addition of the two flows will give the actual streamlines S.

The total strength $\Gamma$ of the circulation about a wing is found by integrating the component of the velocity of the streamlines $S_1$ along the curve S. See Figure 1A. That is $$\Gamma = \int_s V_s ds$$

Any closed path will do since the strength is the same for all paths completely enclosing the wing section.

There are points on a wing where the velocity of the fluid relative to the wing is zero. There is such a point near the nose and another near the trailing edge. In Figure 1A these points are designated A and B. They are called stagnation points.

Attempts have been made to increase the lift of wings by accelerating the boundary layer on the nose and upper surface of wings with some success but the amount of energy required to obtain lift coefficients in excess of 3.0 has been too great. The reason for this has not been understood.

I have found that one of the reasons is that a sufficient circulation cannot be had by the slot systems used. The lift obtained is the result of boundary layer energization which permits the wing to reach large angles of attack but when the wing approaches and surpasses 45 degrees the horizontal projected area becomes appreciably small so that the actual lift decreases.

The circulation about the wing at or above 45 degrees may be high but because of the small projected area of the wing the lift is small.

A high lift could be realized if the circulation could be built up for little or no change in the angular attitude of the wing. A special wing shape is desirable for this purpose.

At a given angle of attack with a conventional wing the amount of circulation is fixed by the presence of a sharp trailing edge. In fact this edge is the agency for altering the circulation about the wing as the wing attitude is changed. That is, it determines the location of the rear stagnation point relative to the wing and the flow.

If higher lifts are to be obtained for a given angle of attack with a low power expenditure the rear stagnation point must be moved forward and to do this a rounded trailing end should be provided. It is then possible to shift the rear stagnation point far forward on the lower surface and the front stagnation point rearward. Then the lift increases as a result of the increase in the strength of the circulation. This increase in lift is over and above the lift increase arising from boundary layer energization and both devices may be used simultaneously, the effect of the one adding to the effect of the other.

The increase of lift arising from the increased circulation is useable to drive a blower to furnish energy for energizing the boundary layer and for creating the circulation. The increased lift represents an increase in the pressure difference between the upper and lower surface which can be utilized by a turbine in a suitable passage to which is coupled a blower. A further description is given below.

The circulation is readily influenced by a properly placed slot in the rounded rear end. The maximum effect however is obtained by blowing at the nose as well. The normal flow at the nose, since it is up, is in the direction of the desired circulation. The normal flow at a blunt rear end is also up and consequently in the wrong direction. It is therefore more important to treat the rear end. Prior art has concerned itself with treating the front end and the object of the present invention is the treatment of the rear end.

Figures 1, 4:
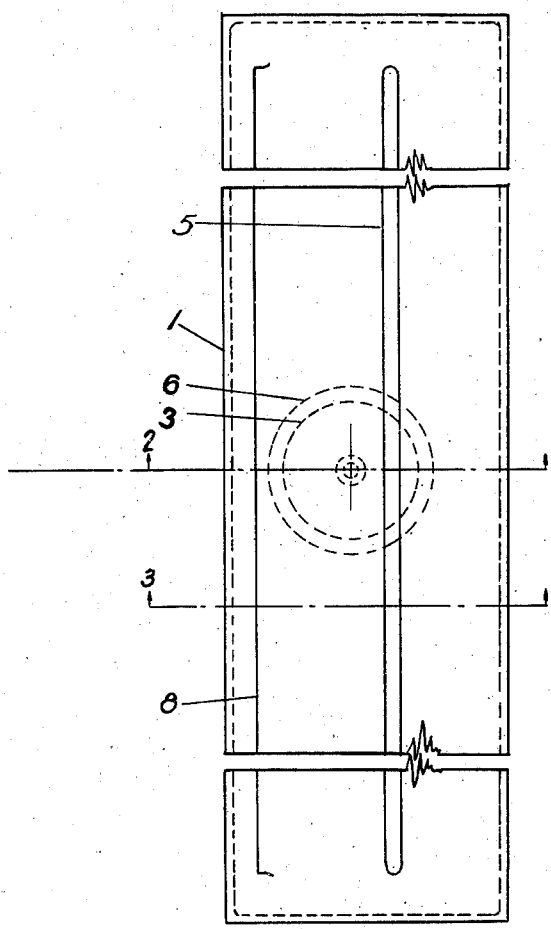
Figure 1 is a top plan view of a wing.
Figure 4 is a front view of the wing.

The increase of the circulation can also alter the boundary layer indirectly. For instance, a slot in the aft portion of the wing as shown in Figure 1 will give an increase in the lifting capacity by increasing the circulation and indirectly affecting the boundary layer. The jet will shift the stagnation point A, the point where the fluid comes to rest, rearward so that the fluid passing over the upper surface will travel a longer path and will therefore soon develop turbulence in the boundary layer. Due to this turbulence there will be small oscillations of the fluid normal to the surface of the wing so that fluid particles having a high velocity will be continuously brought down close to the wing surface and particles of low velocity will be carried upward out of the layer. Thus the layer gains energy and so the flow can cling to the surface of the body more effectively.

In Figures 1 to 4 the wing is 1 and the rear surface slots are 2 and 2a. These slots are directed downward and forward to discharge fluid along the wing surface. The blower 3 draws in air from the suction slot 4 and delivers it to the discharge slot 2. The upper slot 5 serves for drawing in the boundary layer and causes the flow to cling to the upper surface. The lower jet augments the circulation and the combination gives much higher lifts than another having the discharge slot in the nose or upper surface only.

Figures 2, 3:
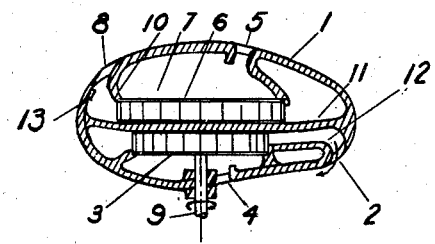
Figure 2 is a vertical chordwise section along the line 2—2 in Figure 1.
Figure 3 is a vertical chordwise section along the line 3—3 in Figure 1.

The blower in Figure 2 is but one rotor of the blower 7 mounted on the shaft 9. The upper rotor 6 draws the air through slot 5 and delivers it to the discharge slot 8 at the nose.

Walls 10, 11 and 12 extend spanwise of the wing as shown in Figures 2 and 3 to maintain the flow separate from each other.

Small vanes 13 are stationed along the walls of the discharge slots to introduce turbulence into the flow as described in my U. S. Patent Number 2,041,793 dated May 26, 1936.

Another form of the invention is shown in Figures 5 to 10.

Figures 6 and 7 particularly show how the wing 14 with the lower flap 15 is converted into a blunt ended wing upon which the rear stagnation point can be controlled. The blunt segment 16 is pushed rearward by a suitable mechanism to be described, until it occupies the position in Figure 6. The segment has the slots 17, 18 and 19 therein directed downward along the surface for the discharge of jet or sheets of fluid to move the rear stagnation point downward and forward.

A rotor 20 of blower 22 as shown in Figure 6 draws in air through the lower slot 22 for delivery to the segment slots. A second rotor 22 draws in air from the slot 23 for discharge through the slot 24. Thus jets are available to influence the flow at both the front and rear of the wing.

The lower surface slot 21 although a suction slot also influences the circulation about the wing because it establishes a stagnation point C well forward on the lower surface. The slot should preferably be located between 50 per cent and 75 per cent of the chord of the basic wing section measured from the nose.

The blower is rotated by the shaft 25.

Figures 7, 9 and 10 illustrate the link mechanism to push the segment 16 chordwise.

Figure 11:
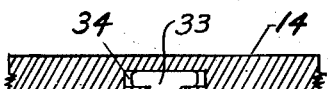
Figure 11 is a fragmentary section taken along line 11—11 in Figure 7.

A block 26 is slidable on a track 27 by pulleys 28 and cables 29. Pivoted to the block at 32 is the rod 30 which is hinge jointed at the other end to the fork 31 which is fixed to the segment 16. A pull on the cables will move the segment. There are guide grooves 34 in the wing structure into which the lugs 33 on the segment fit. See Figures 7, 10 and 11.

The flap 15 is displaced downward by a cylinder 35 actuating the crank 36 as shown in Figure 7.

Figure 12:
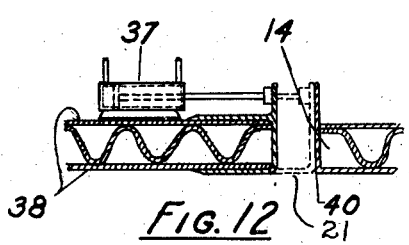
Figure 12 is an enlarged fragmentary view of the slot closing element at the slot 21.

A cylinder 37 operated by fluid closes the slot 21 by sliding the forward wall of the slot rearward. Figure 12 shows how the structure about the slot is formed. The wall is preferably built up of sheet material as shown in Figure 12 but may also be solid. The wing wall is shown at 38 and the walls of the closing element 39 nest it as shown. On the lower surface the wall of the element extends forward and is well rounded to eliminate turbulence. When pushed rearward into the position 40 the juncture at 21 is made flush with the wing surface.

Figure 15:
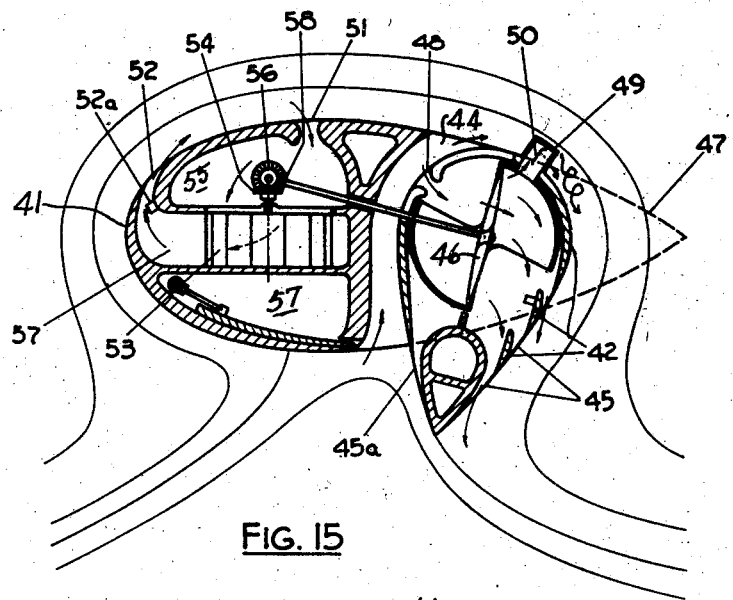
Figure 15 is a vertical section of the wing with the flap depressed.
Figure 14:
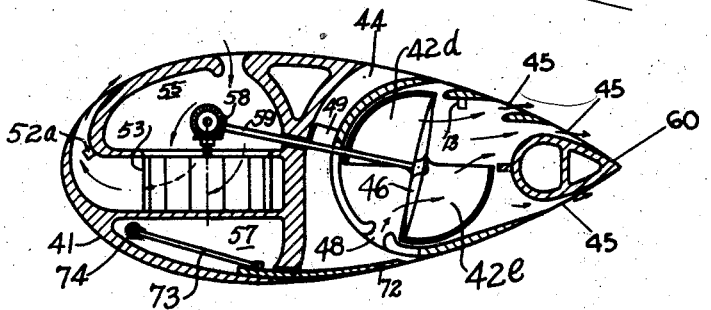
Figure 16:
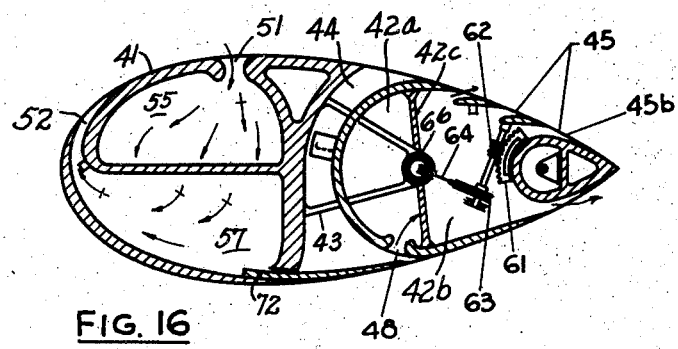

In Figure 13 the wing is 41. It has the flap 42 hinged to the main wing by brackets 43. A through slot 44, Figures 14, 15 and 16, is formed between the fore portion and the flap which has a substantially circular nose. The flap 42 may be depressed through a large angle as shown in Figures 14 and 15. In both upper and lower surfaces there are openings or slots 45 and 45a. Within the flap is a propeller 46 which impels air through the slots. The discharge medium reduces the drag of the wing and by the mass reaction furnishes a propulsive force.

The discharge slots are formed to discharge tangentially along the surface and preferably have a small width of the order of two per cent of the chord length.

The slots should be distributed over the chordwise length of the flap to get the best results. The slots could also be replaced by their equivalent a group of openings of any shape.

It is desirable that the slot furthest around the contour from the top should be a discharge slot in order to force the flow as far forward as possible on the under surface. The preceding slots may be suction slots since their primary purpose is to compel the flow to follow the curved surface at the upper aft curvature.

The flap 42 is divided into two compartments 42a and 42b by the vertical wall 42c. At the propeller the wall is flared to form segments 42d and 42e of a spherical surface about the propeller so that it always draws air from the compartment 42a.

When the rear body or flap 42 is depressed the wing section becomes blunt ended at least within the contour of the original or undistorted section 47. In the depressed position the propeller 46 inducts air from the slot 45a as well as through the induction slot 48 extending spanwise along the flap.

Projecting from the flap are the vanes 49. With the flap in the neutral position these vanes lie within the through slot but for the depressed position they are at the top of the wing where they are effective in inducing the flow to follow the upper contour of the wing.

These vanes are set at an angle to the chord and produce a cross chord force which is accompanied by a tip vortex at each vane tip. The vortices by their rotation continually mix the air flow over the flap close to its surface. In other words they continually transport energy into the boundary layer on the wing surface where energy is continually being lost due to friction.

To make a large supply of energy available jets are discharged from the slots 50 in the vanes. The vortices mix this energetic air with the unenergetic boundary layer. The jets also serve to give a greater cross wind force on the vanes and hence stronger vortices.

To make the main flow follow the blunt aft end it is desirable that the radius of curvature be large. Preferably it should be greater than 10 per cent of the maximum thickness of the wing and the wing should be thick.

In order for the rear of the body to receive the proper flow, boundary layer energization is conducted on the nose and upper surface of the fore part. There is an induction slot 51 and a discharge slot 52, both extending along a substantial portion of the span. All slots should extend along a major portion of any half span length at least.

A blower 53 is driven by the gears 54 and 56 and draws fluid from the wing compartment 55 and discharges it into compartment 57. These two compartments are sealed from each other except through the blower 53. Thus fluid is inducted at the induction slot 51 and discharged from the slot 52. Small vanes 52a in the slot create turbulence in the jet to enable the jet to cling better to the surface.

A gear 58 and shaft 59 rotate the propeller 46 which does not move with the flap 42. A cutout in the nose of the flap accommodates the shaft during the flap rotation.

The gear 56 is fixed to the shaft of the engine 56a so that the engine drives both the rotor 53 and the propeller 46. This system preferably constitutes the chief propulsive system since the discharge jets will both propel the aircraft and reduce the resistance of the wing. If desired, however a propeller P may be added to the aircraft.

Figure 18:
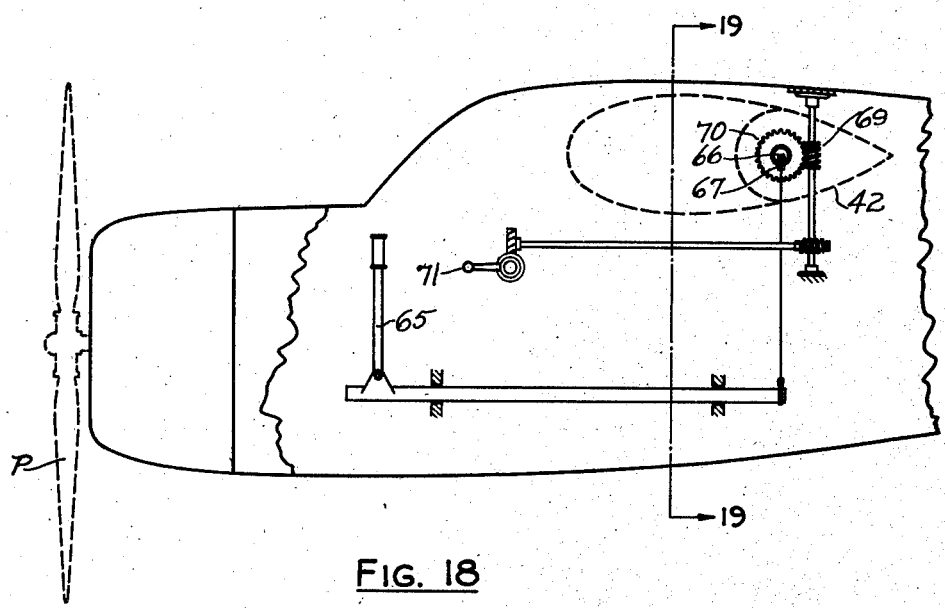
Figure 18 is a diagrammatic side elevation of the airplane showing the wing controls.
Figure 19:
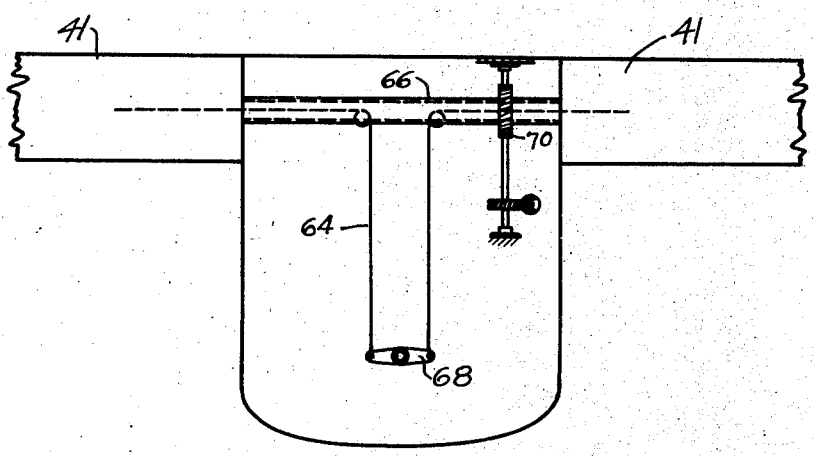
Figure 19 illustrates the control for depressing the flaps and operating the ailerons.

Lateral control is obtained by rotating the control flap 60 by a suitable mechanism such as is shown in Figures 16, 18 and 19.

A segment 61 is fixed to the control flap and engages with the screw 62 fixed to the sprocket 63. A rotation of the sprocket by the cable 64 turns the control flap.

When the trailing edge of the flap goes up the flow out slot 45b is reduced and the circulation about the wing is reduced so that less lift is created. A rotation downward has the opposite effect so that by interconnecting the control flaps on opposite wings through the pilot's steering control 65 the lateral motion of the airplane can be controlled. The cables 64 run through the wing shaft 66 to the cabin and then over pulley 67 to the pilot's control.

The attitude of the main flap 42 is controlled by the worm 69 and gear 70. A movement of the adjusting crank 71 is carried to the gear by suitable intermediate gearing.

The entrance to slot 44 may be closed by a shutter 72 slidable fore and aft by means of a link 73 whose front end is slidable along a spanwise rod 74 in a manner now in use to move split flaps or ailerons.

The blower 53 is also driven by a turbine located in the draft tube 76, Figures 13a and 17. A gear 78 on the shaft 77 meshes with the gear 54 so as to drive the blowers 53 and 46. Since this method of deriving energy from the flow has been described in my U. S. Patent Number 2,041,792 dated May 26, 1936, no further description is given here. It will be noted however that the inlet is in the lower surface and the exit in the upper surface to take advantage of the pressure difference resulting from the increased circulation about the wing as a result of the flow through the aft end of blunt form.

An over-running clutch 79 disengages the engine from the blowers when it fails to function.

Any thickness of wing may be employed even exceeding 100 per cent—as for instance an elliptic section with the major axis vertical. However the preferred sections have thicknesses between 25 per cent and 60 per cent. The wing sections should be free of reversals of curvature on top and the nose radius should be greater than the radius of the blunt end.

It is desirable that the flap should have a chord length greater than 20 per cent of the wing chord.

The length of the arc of the rear end can be defined in several ways. It can for instance be taken between the ends of the original rear edges of the wing before it was transformed into a blunt ended wing. This applies particularly to the case where the rear or auxiliary body is translated rearward. In another case the length can be taken between the points of intersection of the $a$ line through the axis of rotation of the flap and the wing contour, the line being drawn substantially normal to the mean camber line.

A wing has a blunt aft end if the radius of curvature of this end is greater than that customarily employed in present day aircraft—that is, greater than one per cent of the thickness of the wing. However, I prefer radii greater than five per cent of the thickness and of the order shown in the figures.

The blunt end of the wing need not be rounded. It may for instance be a flat surface approximately transverse to the mean line of the wing section. It is desirable however to have the upper and lower surface faired into the flat surface. I prefer a circular or elliptic blunt end.

In the preceding disclosure I have shown how it is possible not only to energize the boundary layer but also how to increase the circulation about the wing. To do the latter the wing should have a rear end shape which will facilitate shifting the rear stagnation point downward and forward. A sharp trailing edge tends to fix the point near the edge. A substantially round end is the most suitable one for shifting the stagnation point. I show how to give a wing a rounded end to obtain this lifting capacity for landing, and a sharp end to obtain a low drag for high speed. I also show how to obtain a rear end of large radius which is important in getting the greatest increase in the lifting capacity for a given amount of energy which is limited by the pressure difference between the upper and lower surfaces at the inlet and exit of the draft tube 76.

Because of the limitation of energy it is important that the wing have slots located to give the maximum available lift effect. The blunt end is the most effective location and with slots cooperates with the turbine blower combination to provide the maximum pressure difference at the turbine which in turn assures the maximum flow through the turbine and the greatest lift. Each augments the other until a balance is struck.

While I have illustrated specific forms of the invention it is to be understood that I do not limit myself to these exact forms but intend to cover my invention broadly as indicated in the appended claims.

I claim:

1. A wing structure adapted to produce high lift in one position and having low drag in another position comprising a wing main body having an upper and a lower airfoil surface terminating in a recessed portion at the trailing end thereof, a lift increasing device adapted to be received within said recess including a part having a curved end, means for mounting said device for adjustment to a high speed position in which said curved end is received within the outline of said wing main body, said curved end part substantially conforming to the depth of the adjacent wing, said device being also adjustable to a high lift position in which said curved end is exposed at the rear of said wing forming a smooth continuation of said upper airfoil surface and extending in a continuous and regular curve to the lower side of the wing and forwardly of the rearmost point of the device providing a rounded blunt end at the rear of the wing, said rounded end having a slot therein adjacent the lower part thereof in the high lift position of said device and opening in the direction of the air circulation, and means within said wing for discharging air from said slot around the blunt end thereof to cause forward advance of the circulation flow and relative closer approach of the front and rear stagnation points.

2. A wing structure adapted to produce high lift in one position and having low drag in another position comprising a wing main body having an upper and a lower airfoil surface terminating in a recessed portion at the trailing end thereof, a lift increasing device adapted to be received within said recess including a part having a curved end, means for mounting said device for adjustment to a high speed position in which said curved end is received within the outline of said wing main body, said curved end part substantially conforming to the depth of the adjacent wing, said device being also adjustable to a high lift position in which said curved end is exposed at the rear of said wing forming a smooth continuation of said upper airfoil surface and extending in a continuous and regular curve to the lower side of the wing and forwardly of the rearmost point of the device providing a rounded blunt end at the rear of the wing, said device having slots therein exposed over said rounded end in the high lift position thereof, the lowermost of said slots being a discharge slot for discharging a flow of air around said blunt end with a forward component of velocity to cause forward advance of the circulation flow and relative closer approach of the front and rear stagnation points, and means within the wing for causing a flow of air through said slots to increase the velocity of the air flow in the boundary layer on said blunt end.

3. A wing structure adapted to produce high lift in one position and having low drag in another position comprising a wing main body having an upper and a lower airfoil surface terminating in a recessed portion at the trailing end thereof, a lift increasing device adapted to be received within said recess including a part having a curved end, means for mounting said device for adjustment to a high speed position in which said curved end is received within the outline of said wing main body, said curved end part substantially conforming to the depth of the adjacent wing, said device being also adjustable to a high lift position in which said curved end is exposed at the rear of said wing forming a smooth continuation of said upper airfoil surface and extending in a continuous and regular curve to the lower side of the wing and forwardly of the rearmost point of the device providing a rounded blunt end at the rear of the wing, said continuous upper curved surface of said wing and flap in the high lift position of the latter being formed with a plurality of slots in communication with the interior of the wing, means for inducting air into the interior of said wing through the upper of said slots to increase the velocity of flow of the boundary layer on the upper surface of said wing and flap, and means to discharge air from the lower of said slots with a forward velocity component.

4. A wing structure adapted to produce high lift in one position and having low drag in another position comprising a wing main body having an upper and a lower airfoil surface terminating in a recessed portion at the trailing end thereof, a lift increasing device adapted to be received within said recess including a part having a curved end, means for mounting said device for adjustment to a high speed position in which said curved end is received within the outline of said wing main body, said curved end part substantially conforming to the depth of the adjacent wing, said device being also adjustable to a high lift position in which said curved end is exposed at the rear of said wing forming a smooth continuation of said upper airfoil surface and extending in a continuous and regular curve to the lower side of the wing and forwardly of the rearmost point of the device providing a rounded blunt end at the rear of the wing, said rounded end having a slot therein adjacent the lower part thereof in the high lift position of said device and opening in the direction of the air circulation, means within said wing for discharging air from said slot around the blunt end thereof to cause forward advance of the circulation flow and relative closer approach of the front and rear stagnation points, a closure flap, and means for adjustably mounting said closure flap for closing the space between said wing main body and said device and completing the smooth external contour of said wing.

5. A wing structure adapted to produce high lift in one position and having low drag in another position comprising a wing main body having an upper and a lower airfoil surface terminating in a recessed portion at the trailing end thereof, a lift increasing device adapted to be received within said recess including a part having a curved end and an opposite tapering end, means for rotatably mounting said device for adjustment to a high speed position in which said curved end is received within the outline of said wing main body, said curved end part substantially conforming to the depth of the adjacent wing, said device being also adjustable to a high lift position in which said tapered end is lowered and said curved end is exposed at the rear of said wing forming a smooth continuation of said upper airfoil surface and extending in a continuous and regular curve below the lower surface of said wing main body and forwardly of the rearmost point of the device providing a rounded blunt end at the rear of the wing, said rounded end having a slot therein adjacent the tapering end of said device opening in a rearward direction in the high speed position of said device, and means within said wing for discharging air from said slot, said air being discharged with a forward component of velocity in the high lift position of said device to cause forward advance of the circulation flow and relative closer approach of the front and rear stagnation points.

6. A wing structure adapted to produce high lift in one position and having low drag in another position comprising a wing main body having an upper and a lower airfoil surface terminating in a recessed portion at the trailing end thereof, a lift increasing device adapted to be received within said recess including a part having a curved end, means for adjustably mounting said device for retracting movement to a high speed position in which said device is received within the outline of said wing main body, said curved end part substantially conforming to the depth of the adjacent wing, an auxiliary closing flap for closing over said device in said retracted positions and completing the airfoil contour of said wing, said device being also bodily movable out of said recess to a high lift position in which said curved end is exposed at the rear of said wing forming a smooth continuation of said upper airfoil surface and extending in a continuous and regular curve below the lower surface of said wing main body and forwardly of the rearmost point of the device providing a rounded blunt end at the rear of the wing, said rounded end having a slot therein adjacent the lower part thereof in the high lift position of said device and opening in the direction of the air circulation, and means within said wing for discharging air from said slot around the blunt end thereof to cause forward advance of the circulation flow and relative closer approach of the front and rear stagnation points.

EDWARD A. STALKER.